United States Patent
Franz et al.

(10) Patent No.: US 6,698,764 B2
(45) Date of Patent: Mar. 2, 2004

(54) PACKING ASSEMBLY

(75) Inventors: Peter Franz, Birsfelden (CH); Bernd Roese, Inzlingen (DE)

(73) Assignee: Coperion Buss AG, Pratteln (CH)

( * ) Notice: Subject to any disclaimer, the term of this patent is extended or adjusted under 35 U.S.C. 154(b) by 0 days.

(21) Appl. No.: 09/951,110

(22) Filed: Sep. 12, 2001

(65) Prior Publication Data

US 2002/0047241 A1 Apr. 25, 2002

(30) Foreign Application Priority Data

Sep. 12, 2000 (CH) .............................. 1770/00

(51) Int. Cl.⁷ .............................. F16J 15/26
(52) U.S. Cl. ................ 277/520; 277/506; 277/507; 277/512
(58) Field of Search ................. 277/520, 506, 277/507, 510, 511, 512, 516, 524, 525, 503, 504, 505; 403/122, 128, 131, 135

(56) References Cited

U.S. PATENT DOCUMENTS

| | | | | |
|---|---|---|---|---|
| 2,126,007 A | * | 8/1938 | Guiberson | 277/329 |
| 2,806,748 A | * | 9/1957 | Krotz | 384/149 |
| 3,680,443 A | * | 8/1972 | Jenvey | 180/428 |
| 3,815,925 A | * | 6/1974 | Mattoon | 137/68.11 |
| 3,887,196 A | * | 6/1975 | Renfrow | 277/318 |
| 3,971,565 A | * | 7/1976 | Schickling et al. | 277/551 |
| 4,067,583 A | * | 1/1978 | Germain et al. | 277/389 |
| 4,109,713 A | * | 8/1978 | Clow | 137/68.11 |
| 4,129,306 A | * | 12/1978 | Konno et al. | 277/507 |
| 4,480,842 A | * | 11/1984 | Mahyera et al. | 277/329 |
| 4,553,760 A | * | 11/1985 | Reed et al. | 180/9.5 |
| 4,667,967 A | * | 5/1987 | Deuring | 277/351 |
| 4,726,595 A | * | 2/1988 | Hanmore | 277/346 |
| 4,909,654 A | * | 3/1990 | Tysver | 403/79 |
| 5,056,758 A | * | 10/1991 | Bramblet | 251/214 |
| 5,263,682 A | * | 11/1993 | Covert et al. | 137/312 |
| 5,290,374 A | * | 3/1994 | Holtz et al. | 148/559 |
| 5,476,117 A | * | 12/1995 | Pakula | 137/312 |
| 5,501,421 A | * | 3/1996 | Kluting | 248/288.31 |
| 5,590,966 A | * | 1/1997 | Cherny et al. | 384/16 |
| 5,667,312 A | * | 9/1997 | Grunze et al. | 384/450 |
| 5,791,411 A | * | 8/1998 | Ricalton et al. | 166/84.1 |
| 6,270,247 B1 | * | 8/2001 | Tschopp | 366/289 |
| 6,338,589 B1 | * | 1/2002 | Kincaid et al. | 403/130 |

FOREIGN PATENT DOCUMENTS

| | | |
|---|---|---|
| FR | 2 450 393 | 9/1980 |
| GB | 684373 | 12/1952 |
| WO | WO 94/21944 | 9/1994 |

* cited by examiner

*Primary Examiner*—Robert J. Sandy
*Assistant Examiner*—Thomas Ho
(74) *Attorney, Agent, or Firm*—Magnot, Moore & Beck

(57) ABSTRACT

The invention provides a packing assembly for rotating and/or oscillating machine shafts arranged in a machine housing. The packing assembly comprises a packing accommodation unit floating on said shaft. The packing accommodation unit is supported on the housing by means of a ball joint assembly that is pivotable and translatory movable in a radial direction to and from the shaft. The ball joint assembly comprises a ball member provided with a central bore received in a ball socket. A guiding element projecting into the bore of the ball member serves for translatory guiding the ball member along the axis of the bore in the ball member, whereby the axis of the bore on the ball member runs essentially perpendicular to the central longitudinal axis of the shaft.

29 Claims, 2 Drawing Sheets

PACKING ASSEMBLY

BACKGROUND OF THE INVENTION

The present invention refers to a packing assembly for sealing a machine shaft rotating and/or oscillating in a machine housing, comprising a packing accommodation member adapted to be floatingly arranged on the machine shaft and a ball joint assembly adapted to support the packing accommodation member such as to prevent rotation and/or axial motion thereof with respect to the machine housing.

Such a packing assembly can be used, for example, for sealing the interior of the working chamber of a processing machine having a rotating and/or oscillating shaft, particularly machines and apparatuses used in the chemical, plastic, food, pharmaceutical and cosmetics industries for mixing, kneading, plasticizing and homogenizing a product.

A fundamental problem in the field of sealing a working chamber having therein a rotating shaft may be seen in the fact that such shaft always show, to a more or less extent, run out of true, pendulum motion and dynamic unbalance. It is understood that these errors have a negative influence on the sealing properties of the packing assemblies discussed herein, because a radially directed relative motion of the shaft with respect to the sealing packets of the packing assembly occurs, with the result that the sealing packets are heavily stressed. Particularly, pendulum motions have a pronounced negative effect on the sealing characteristics and the service life of such packing assemblies.

The above discussed problems are particularly accentuated in the case of big, heavy and greatly stressed shafts, particularly if they not only rotate, but simultaneously perform an oscillating movement.

In order to circumvent the above mentioned problems, so-called floating shaft sealing assemblies have been used in the past, in which a sealing packet accommodation member is floatingly received on the machine shaft. A problem to be solved in connection with these floating sealing assemblies is how to support such assemblies, ensuring a corresponding degree of freedom to allow for pendulum and wobbling motions of the shaft. Up to now, usually elastic support elements have been used which allow both for radial deflection and pendulum motion of the machine shaft. However, experience has shown that the service life of such elastic support elements is very limited, particularly if they are under great thermal stress. Moreover, they can bear only comparatively small torque forces and show relatively high reset forces, further impairing the service life of the sealing packets.

PRIOR ART

The patent publication DE 1,214,199 discloses an apparatus for mounting vertically extending rotating shafts. This apparatus comprises a packing gland floatingly arranged on the shaft, sealing the shaft with regard to the housing in cooperation with a movable folding bellows, a stuffing box and a stuffing box gland.

The patent publication FR 2,450,393 discloses a sealing assembly for sealing shaft members extending through the wall of a housing. The sealing assembly includes a stuffing box floatingly arranged between the housing and the shaft. As a means for preventing rotation of the stuffing box, a screw is provided which is fixed to the housing and engages a recess in the stuffing box. A waterproof seal between the housing wall and the stuffing box is ensured by a bellows sealing member, allowing for relative movement between the floating stuffing box and the housing.

The patent publication GB 684,373 discloses a reaction vessel having a rotating mixing and stirring shaft. For the sake of sealing the shaft extending through the vessel wall, both sides of the wall of the reaction vessel comprise sealing members in the form of stuffing boxes. A portion of the housing of the stuffing box shows a spherical surface which is supported by means of an annular element, having a spherical surface as well and being welded to the wall of the reaction vessel. For stationary fixing the stuffing box, a retainer cap is provided which is bolted to the housing of the reaction vessel. The retaining cap is provided with a spherical interior surface located at its upper end, in which the stuffing box housing, having a spherically shaped surface portion as well, is supported. Such a design allows for pendulum motions of the shaft with regard to the reaction vessel. For filling a space between the stuffing box housing and the retaining cap, pipes extending through the retaining cap are provided.

Finally, the patent publication WO 94 21944 discloses a self-aligning shaft bearing provided with a stuffing box. The shaft bearing comprises a bearing housing defining in its interior a bearing chamber. The bearing housing comprises an essentially tube-shaped base member and a closure element bolted to the base member. The bearing chamber is located between the outermost end of the base member and the interior of the closure element. Moreover, that shaft bearing comprises a guiding assembly comprising a tube-shaped inner element through which the shaft extends. The inner element is provided with two radially extending flange members which are supported by a bearing element located in the corresponding bearing chamber. This shaft bearing is suitable both for rotating and oscillating movements of the shaft.

OBJECTS OF THE INVENTION

With the above discussed prior art in mind, it is an object of the present invention to provide a packing assembly for sealing a machine shaft rotating and/or oscillating in a machine housing, having a ball joint assembly for supporting a packing accommodation member adapted to be floatingly arranged on the machine shaft, which is of simple design and can be manufactured at low costs, whose service life nevertheless is considerably extended and which ensures a reliable and long-time stable sealing of the machine shaft.

SUMMARY OF THE INVENTION

In order to meet this and other objects, the present invention provides a packing assembly for sealing a machine shaft rotating and/or oscillating in a machine that comprises a packing accommodation member adapted to be floatingly arranged on the machine shaft and a ball joint assembly adapted to support the packing accommodation member such as to prevent rotation and/or axial motion with respect to the machine housing.

The ball joint assembly includes a ball member provided with a central bore and a socket member for rotatably receiving the ball member. The packing assembly further comprises a guiding element having a guiding portion projecting into the central bore provided in the ball member and adapted to translatory guide the ball member along the central longitudinal axis of the central bore in the ball member. Thereby, the central longitudinal axis of the bore in the ball member runs essentially perpendicular to the central longitudinal axis of the machine shaft.

The proposed packing assembly avoids to a farthest extent both translatory relative motions between packing assembly and machine shaft as well as relative pendulum motions between packing assembly and machine shaft. Moreover, the herein disclosed ball joint assembly is essentially maintenance-free. Pendulum motions of the shaft and the sealing packet accommodation member floatingly received thereon, respectively, are absorbed by the ball joint assembly and transformed into lateral motions. The ball joint assembly, moreover, is of simple design, can be manufactured at low costs and has an extended service life. Furthermore, it exhibits comparatively low reset forces.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
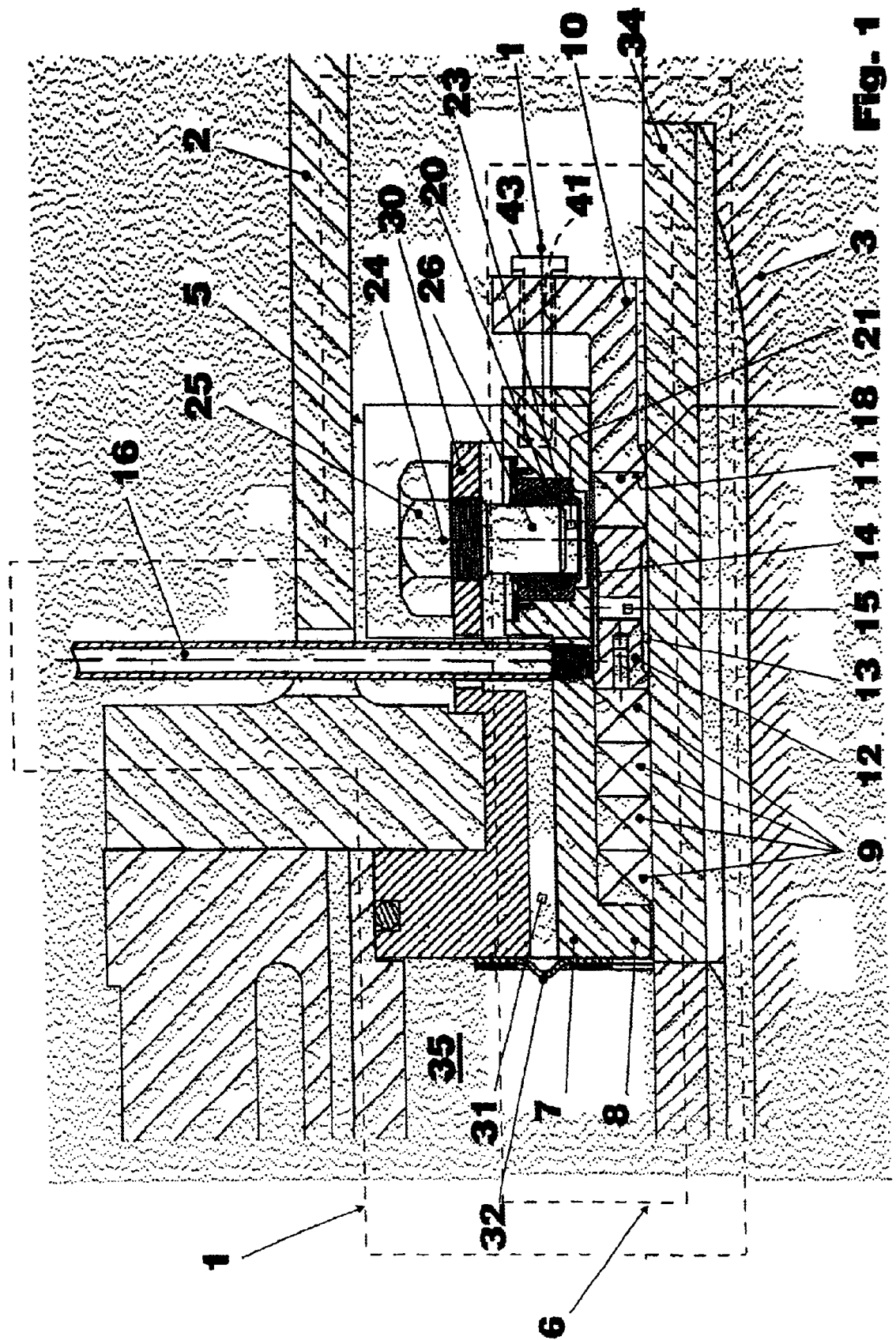
FIG. 1 shows a longitudinal sectional view of the packing assembly, including the ball joint assembly.

In the following, the design and the principle of operation of an embodiment of the packing assembly according to the invention will be further described, with the help of FIG. 1.

The packing assembly, generally designated by reference numeral 1, is located between a machine housing 2 and a machine shaft 3 which is mounted in the machine housing 2 to be rotating and/or oscillating. The packing assembly 1 is provided with a packing accommodation unit 6 designed and operating according to the principle of a stuffing box or packing gland. The packing accommodation unit 6 is adapted to receive and fix sealing packets 9. The packing accommodation unit 6 comprises a hollow cylindrical sleeve member 7 enclosing the machine shaft 3. The one end portion of the sleeve member 7 is provided with a stop collar 8 protruding radially inwards, and the other end portion of the sleeve member 7 is provided with a (not shown) internal thread. For fixing the sealing packets 9, a clamping liner 10, having a (not shown) external thread, is provided which is adapted to be screwed into the sleeve member 7. Between the front face 11 of the clamping liner 10 and the stop collar 8 of the sleeve member 7, four sealing packets 9 as well as an annular element 12 and a further sealing packet and/or a bearing ring member 18 are provided. The clamping liner 10 is provided with a plurality of bores 41 located along a scribed circle 19, said bores being adapted to receive threaded bolt means 43 that are screwed into an end region of said sleeve member 7 opposite to said clamping liner 10 for fixing and compressing said sealing packets 9.

For supporting the packing assembly such that any rotational movement thereof is prevented, a ball joint assembly 5 is provided. The ball joint assembly 5 comprises a ball member 20 provided with a central bore 21. The ball member 20 is supported in a ball socket 23 fixed to the sleeve member 7. The ball member 20 is arranged such that the central axis of the bore 21 runs perpendicular to the central longitudinal axis of the machine shaft 3. For translatorily guiding the ball member 20 along the axis of its central bore 21, a guiding element 25 is provided which projects into the central bore 21 of the ball member 20. The guiding element 25 is generally designed as a screw member having a cylindrical front portion 26. It is screwed into a supporting member 30 whereby the cylindrical front portion 26 of the guiding element 25 stands out of the supporting member 30. The supporting member 30 is of annular shape and fixed to the machine housing 2.

The ball joint assembly 5, as shown in the drawings, can follow both tilting movements of the shaft 3 as well as translatory motion thereof running perpendicular to the central and rotational axis of the shaft 3. While a pendulum motion of the machine shaft 3 is followed by a rotation of the ball member 20 relative to its ball socket 23, radial deflections of the machine shaft 3, particularly initiated by a shaft 3 running out of true or by dynamic unbalance, cause a translatory relative movement between ball member 20 and the guiding element 25 along the central longitudinal axis of the bore 21 in the ball member 20 and the central longitudinal axis of the guiding element 25, respectively.

Such a ball joint assembly 5 constitutes a fundamentally rigid element for supporting the packing assembly 1 in a manner preventing rotation thereof, whereby the packing assembly 1 can float on the machine shaft 3. The result is that wear of the packing assembly 1 and particularly of the sealing packets 9 is considerably reduced since only rotational and, if appropriate, axial motions occur between the sealing packets 9 and the machine shaft 3. The sliding friction of the cylindrical front portion 26 of the guiding element 25 running in the central bore 21 of the ball member 20 is close to zero, with the result that unwanted deformation forces acting on the sealing packets 9 are virtually eliminated. The ball joint assembly 5 itself is essentially maintenance-free and free from wear, in contrast to the flexible supporting assemblies known in the prior art.

It is understood that a kinematically reverse arrangement between the ball joint assembly 5 and the guiding element 25 would be possible, for example, if the ball joint assembly 5 would be directly or indirectly fixed to the machine housing 2 and the guiding element 25 fixed to the packing assembly 1.

In order to be able to seal an annular gap 31 located between the sleeve member 7 and the supporting member 30 against the working chamber 35, a diaphragm 32 is provided whose front face is fixed to the supporting member 30 and to the sleeve member 7. Additionally or alternatively, the annular gap 31 can be filled with a sealing foam.

The ring element 12 is provided with a first recess 13 located at its outside and facing the machine housing 2, and a second recess 14 located at its inside and facing the shaft 3. Moreover, the ring element 12 is provided with at least one bore 15 interconnecting the two recesses 13, 14. The recesses 13, 14 of the ring element 12 are communicating with a tube member 16 running through the machine housing 2 in radial direction. By means of this tube member 16, the recesses 13, 14 can be flooded with a fluid or gaseous medium. Thereby, the danger is eliminated that for example atmospheric oxygen can penetrate into the working chamber 35 through the sealing packets 9.

The bearing ring 18 inserted between the annular element 12 and the clamping liner 10 acts as a plain bearing, favoring the floating of the packing assembly 1 on the shaft 3. Preferably, the bearing ring 18 is manufactured of a plastic material having good self-lubricating properties. In place of the bearing ring 18 or additionally to the bearing ring 18, one or more sealing packets can be inserted for preventing the medium used for flooding the recesses 13, 14 to escape to the outside.

In order to increase the abrasion resistance of the shaft 3 in the area of the packing accommodation unit 6 and the sealing packets 9, respectively, the shaft 3 is provided with a jacket member 34 of hollow cylindrical shape and a surface that matches the specific requirements.

Figure 2:
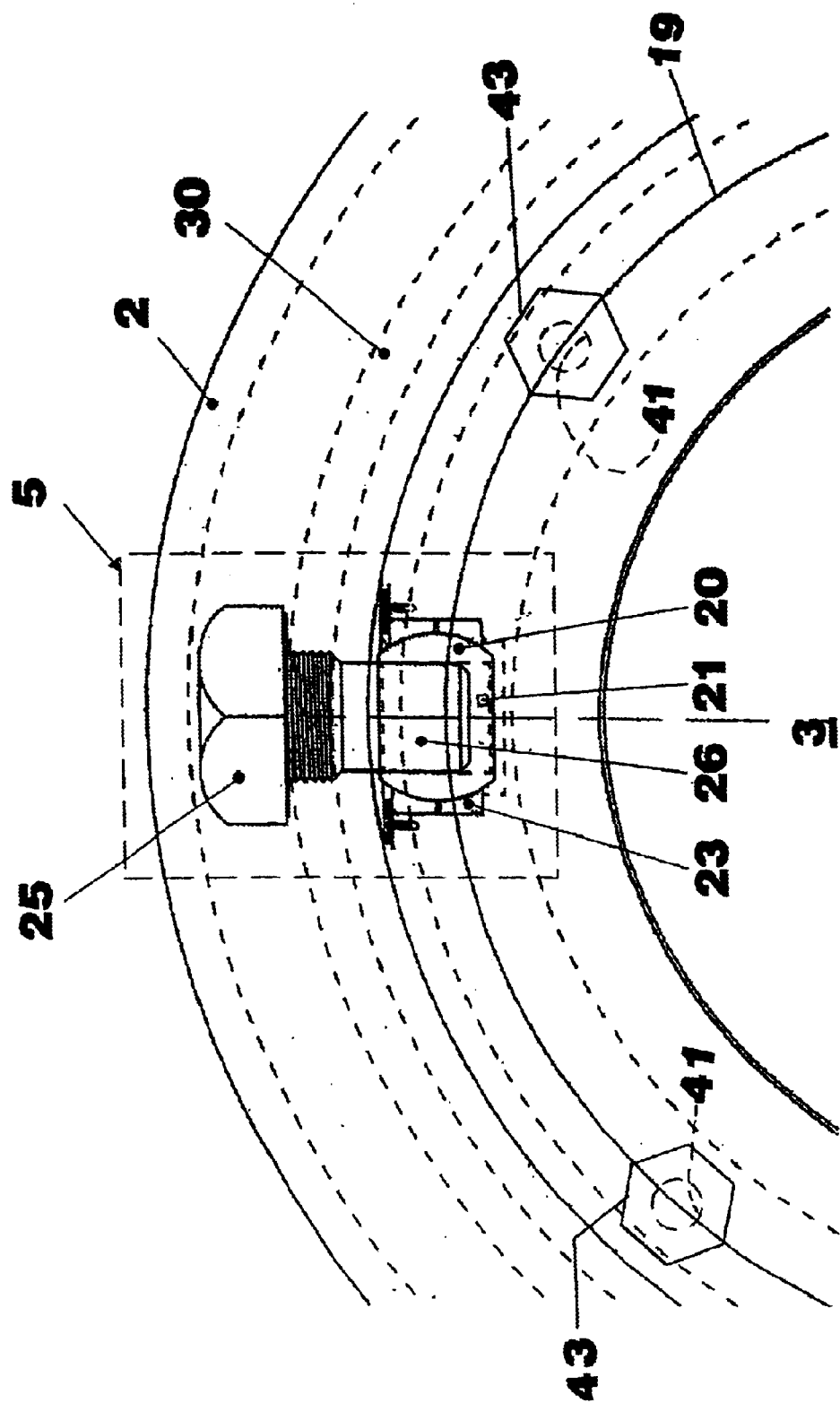
FIG. 2 shows a cross sectional view of the ball joint assembly.

FIG. 2, showing the ball joint assembly 5 in a cross sectional view, clearly illustrates the ball member 20 provided with a central bore 21, the ball socket 23 as well as the guiding element 25 projecting into the central bore 21.

The packing assembly as herein before described and according to the invention offers a number of considerable advantages:

- The ball joint assembly can follow both radial deflections and pendulum motions of the shaft.
- The ball joint assembly is thermally tolerant.
- The ball joint assembly exhibits comparatively low reset forces.
- The ball joint assembly can bear high torque forces.
- The ball joint assembly has a long service life ans is essentially maintenance-free.
- The ball joint assembly is of simple design and can be manufactured at low costs.
- The ball joint assembly can be used with shafts running horizontally, vertically or in an arbitrary three dimensional spatial angle.

What is claimed is:

1. A packing assembly for sealing a shaft rotating and/or oscillating in a housing and having a central longitudinal axis, comprising:
   a packing accommodation unit configured to be floatingly arranged on said shaft;
   a ball joint assembly operative to support said packing accommodation unit so as to prevent rotation and/or axial motion with respect to said housing, said ball joint assembly including (i) a ball member provided with a central bore having a central longitudinal axis, and (ii) a socket member for rotatably receiving said ball member;
   a guiding element mechanically fixed in relation to said housing and having a guiding portion projecting into said central bore provided in said ball member and configured to translatory guide said ball member along said central longitudinal axis of said central bore,
   wherein said central longitudinal axis of said bore in said ball member is maintained in a fixed relation to said housing during pendulum motion of said shaft.

2. A packing assembly according to claim 1 in which:
   said ball member and said socket member are fixed to said packing accommodation unit,
   said packing accommodation unit is provided with a sealing mechanism, and
   said guiding element is mechanically coupled to said housing.

3. A packing assembly according to claim 1 in which:
   said ball member and said socket member are mechanically coupled to said housing,
   said guiding element is fixed to said packing accommodation unit, and
   said packing accommodation unit is provided with a sealing mechanism.

4. A packing assembly according to claim 2 in which said ball member is translatory movable in a radial direction to and from said shaft with regard to said guiding element.

5. A packing assembly according to claim 2 in which said guiding element is translatory movable in a radial direction to and from said shaft with regard to said ball member.

6. A packing assembly according to claim 2 in which said packing accommodation unit is enclosed by an annular gap which is sealed by a diaphragm.

7. A packing assembly according to claim 2, further comprising a supporting member connected to said housing, said guiding element being fixed to said supporting member.

8. A packing assembly according to claim 7 in which:
   said guiding element includes a screw having a cylindrical front portion configured to guide said ball member, and
   said screw is screwed into said supporting member such that said front portion projects over said supporting member.

9. A packing assembly according to claim 1 in which:
   said packing accommodation unit comprises a sleeve having hollow cylindrical shape and enclosing said shaft, and
   the interior of said sleeve is provided with a plurality of sealing packets resting on said shaft.

10. A packing assembly according to claim 9 in which:
    one end portion of said sleeve is provided with a stop collar projecting radially inwards, and another end portion of said sleeve is provided with internal threads, and
    said packing assembly further comprising a clamping liner provided with external threads configured to be screwed into said sleeve for fixing and compressing said plurality of sealing packets between said stop collar and an end front face of said clamping liner.

11. A packing assembly according to claim 10 in which:
    said clamping liner is provided with a plurality of liner bores located along a scribed circle,
    said packing assembly further includes a plurality of threaded bolts,
    said plurality of liner bores are configured to respectively receive said plurality of threaded bolts, and
    said plurality of threaded bolts are screwed into an end region of said sleeve opposite to said clamping liner for fixing and compressing said plurality of sealing packets.

12. A packing assembly according to claim 10, further comprising an annular element inserted between said end front face of said clamping liner and said plurality of sealing packets, said annular element being provided with a first recess located at its outside and facing said housing and a second recess located at its inside and facing said shaft, said first and second recesses communicating with a supply tube for supplying a fluid or gaseous medium.

13. A packing assembly according to claim 10 in which at least one additional sealing packet is inserted between said stop collar of said sleeve and said end front face of said clamping liner.

14. A packing assembly according to claim 3 in which said ball member is translatory movable in a radial direction to and from said shaft with regard to said guiding element.

15. A packing assembly according to claim 3 in which said guiding element is translatory movable in a radial direction to and from said shaft with regard to said ball member.

16. A packing assembly according to claim 11, further comprising an annular element inserted between said end front face of said clamping liner and said plurality of sealing packets, said annular element being provided with a first recess located at its outside and facing said housing, and a second recess located at its inside and facing said shaft, said first and second recesses communicating with a supply tube for supplying a fluid or gaseous medium.

17. A packing assembly according to claim 2, wherein:

said packing accommodation unit is enclosed by an annular gap, and said annular gap is filled with a quantity of foam material.

18. A packing assembly according to claim 10 in which a bearing ring is inserted between said stop collar of said sleeve and said end front face of said clamping liner.

19. A packing assembly for sealing a shaft mounted in a housing, comprising:

a sealing assembly positioned in contact with said shaft;

a ball joint assembly operative to support said sealing assembly and including (i) a ball member having defined therein a central bore, said central bore defining a longitudinal bore axis, and (ii) a socket member for rotatably receiving said ball member;

a guiding element configured to be mechanically coupled to said housing, said guiding element having a guiding portion projecting into said central bore and configured to guide movement of said ball member along said longitudinal bore axis, wherein said guiding element is maintained in a fixed relation to said housing during pendulum motion of said shaft.

20. The packing assembly of claim 19, wherein said sealing assembly includes:

a cylindrical sleeve supported by said ball joint assembly, a clamping liner attached to said cylindrical sleeve, and a plurality of sealing packets interposed between said cylindrical sleeve and said clamping liner.

21. The packing assembly of claim 20, wherein:

said sealing assembly further includes an annular element, said annular element includes a first recess facing said shaft and a second recess facing said housing, said annular element further includes an element bore extending from said first recess to said second recess, and said second recess is in fluid communication with a fluid source.

22. The packing assembly of claim 21, wherein:

said sealing assembly further includes a tube member interposed between said fluid source and said annular element, and said tube member includes a passage for allowing fluid to travel from said fluid source to said second recess.

23. The packing assembly of claim 19, further comprising:

a supporting member mechanically coupled between said housing and said ball joint assembly, wherein an annular gap is defined between said supporting member and a cylindrical sleeve of said sealing assembly, and a diaphragm coupled to both said supporting member and cylindrical sleeve so as to be located adjacent to said annular gap.

24. The packing assembly of claim 19, wherein said guiding element maintains said longitudinal bore axis of said ball member in a fixed relation to said housing during pendulum motion of said shaft.

25. An assembly, comprising:

a housing;

a shaft located in said housing, said shaft configured to rotate and/or oscillate in relation to said housing;

a sealing assembly positioned in contact with said shaft;

a ball joint assembly operative to support said sealing assembly and including (i) a ball member having defined therein a central bore, said central bore defining a longitudinal bore axis, and (ii) a socket member for rotatably receiving said ball member;

a guiding element mechanically coupled to said housing, said guiding element having a guiding portion projecting into said central bore and configured to guide movement of said ball member along said longitudinal bore axis, wherein said guiding element is fixed in relation to said housing during pendulum motion of said shaft.

26. The assembly of claim 25, wherein said sealing assembly includes:

a cylindrical sleeve supported by said ball joint assembly, a clamping liner attached to said cylindrical sleeve, and a plurality of sealing packets interposed between said cylindrical sleeve and said clamping liner.

27. The packing assembly of claim 26, further comprising:

a supporting member mechanically coupled between said housing and said ball joint assembly, wherein an annular gap is defined between said supporting member and said cylindrical sleeve of said sealing assembly, and a diaphragm coupled to both said supporting member and cylindrical sleeve so as to be located adjacent to said annular gap.

28. The packing assembly of claim 25, wherein said guiding element maintains said longitudinal bore axis of said ball member in a fixed relation to said housing during pendulum motion of said shaft.

29. A packing assembly for sealing a shaft mounted in a housing, comprising:

a sealing assembly configured to be positioned in contact with said shaft;

a ball joint assembly operative to support said sealing assembly and including (i) a ball member having defined therein a central bore, said central bore defining a longitudinal bore axis, and (ii) a socket member for rotatably receiving said ball member;

a support member configured to be attached to said housing, said supporting member having an internally threaded bore defined therein;

a bolt having an externally threaded portion configured to mate with said internally threaded bore of said support member, said bolt member further having a guiding portion projecting into said central bore of said ball member and configured to guide movement of said ball member along said longitudinal bore axis.

* * * * *